United States Patent
Hwang et al.

(10) Patent No.: US 10,098,156 B2
(45) Date of Patent: Oct. 9, 2018

(54) METHOD AND MTC DEVICE FOR PERFORMING RANDOM ACCESS PROCEDURE ACCORDING TO PLURALITY OF PARAMETER SETS

(71) Applicant: LG ELECTRONICS INC., Seoul (KR)

(72) Inventors: Daesung Hwang, Seoul (KR); Joonkui Ahn, Seoul (KR); Suckchel Yang, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 46 days.

(21) Appl. No.: 15/108,857

(22) PCT Filed: Dec. 23, 2014

(86) PCT No.: PCT/KR2014/012676
§ 371 (c)(1),
(2) Date: Jun. 29, 2016

(87) PCT Pub. No.: WO2015/102281
PCT Pub. Date: Jul. 9, 2015

(65) Prior Publication Data
US 2016/0323917 A1    Nov. 3, 2016

Related U.S. Application Data

(60) Provisional application No. 61/922,056, filed on Dec. 30, 2013.

(51) Int. Cl.
*H04W 74/08* (2009.01)
*H04W 4/70* (2018.01)

(52) U.S. Cl.
CPC ......... *H04W 74/0833* (2013.01); *H04W 4/70* (2018.02)

(58) Field of Classification Search
CPC ............ H04W 74/0833; H04W 74/08; H04W 74/004; H04W 4/005; H04L 27/2613; H04L 5/0053
See application file for complete search history.

(56) References Cited

U.S. PATENT DOCUMENTS

2009/0168750 A1* 7/2009 Pelletier ................ H04W 52/50
370/350
2012/0099543 A1    4/2012 Yang et al.
(Continued)

FOREIGN PATENT DOCUMENTS

CN       103220811 A       7/2013
CN       103379656 A       10/2013

OTHER PUBLICATIONS

Huawei et al., "Considerations on the random access of MTC UEs with coverage improvement," 3GPP TSG RAN WG1 Meeting #75, R1-135020, San Francisco, USA, Nov. 11-15, 2013, XP050734723, 5 pages.

(Continued)

*Primary Examiner* — Wei Zhao
(74) *Attorney, Agent, or Firm* — Birch, Stewart, Kolasch & Birch, LLP

(57) ABSTRACT

One embodiment of the present specification provides a method for performing a random access procedure for coverage enhancement. The method can comprise the steps of: determining a PRACH resource for a random access preamble on the basis of a repetition level; generating a random access preamble in a specific cell; and repetitively transmitting the generated random access preamble according to the repetition level on the basis of the determined PRACH resource.

5 Claims, 14 Drawing Sheets

(56) References Cited

U.S. PATENT DOCUMENTS

2013/0170435 A1* 7/2013 Dinan ................. H04L 45/50
370/328
2015/0078264 A1* 3/2015 Han ................. H04W 74/0833
370/329

OTHER PUBLICATIONS

MediaTek Inc., "Discussion on PRACH and RACH procedure in coverage enhancement mode," 3GPP TSG-RAN WG1 #75, R1-135424, San Francisco, USA, Nov. 11-15, 2013, XP050735102, 5 pages.
Huawei, HiSilicon "Determining the repetition level during initial random access and non-initial", R1-135382, 3GPP TSG RAN WG1 Meeting #75, San Francisco, USA, Nov. 11-15, 2013.
MediaTek Inc., "Coverage report during random access and PRACH formats/configurations", R1-134442, 3GPP TSG-RAN WG1 #74b, Guangzhou, P. R. China, Oct. 7-11, 2013.
Sharp, "Discussion on PRACH coverage enhancement for MTC UE", R1-135342, 3GPP TSG RAN WG1 Meeting #75, San Francisco, USA, Nov. 11-15, 2013.
Sharp, "PRACH coverage enhancement for MTC UE", R1-134472, 3GPP TSG RAN WG1 Meeting #74bis, Guangzhou, China, Oct. 7-11, 2013.

* cited by examiner

FIG. 6
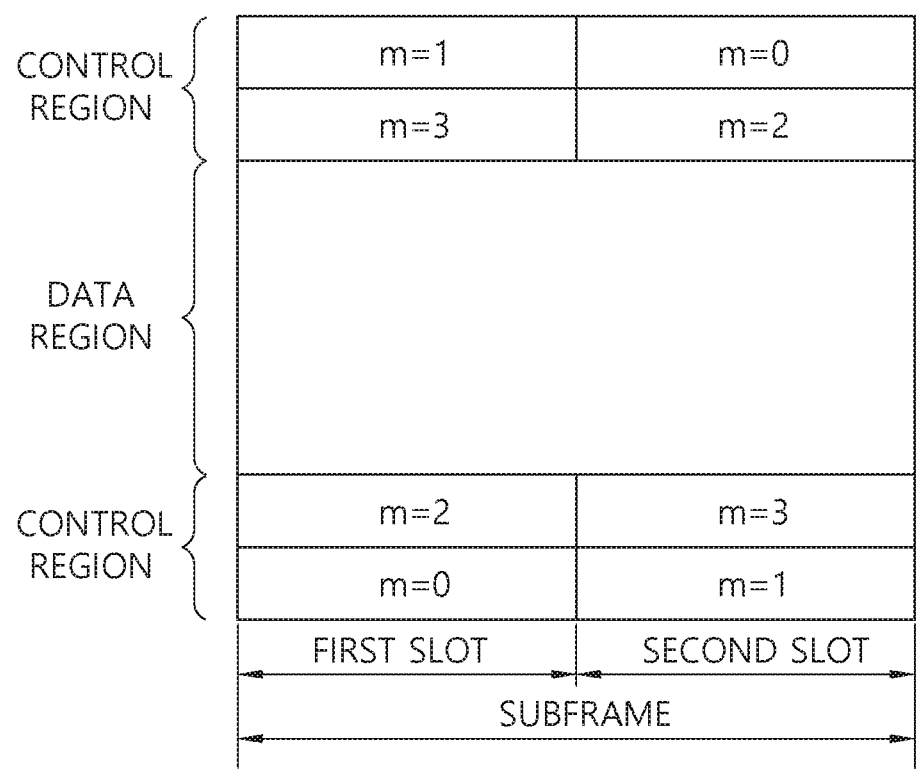
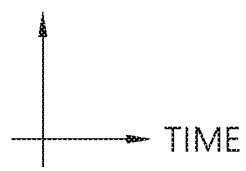

METHOD AND MTC DEVICE FOR PERFORMING RANDOM ACCESS PROCEDURE ACCORDING TO PLURALITY OF PARAMETER SETS

CROSS REFERENCE TO RELATED APPLICATIONS:

This application is the National Phase of PCT/KR2014/012676 filed Dec. 23, 2014, which claims priority under 35 U.S.C. § 119(e) to U.S. Provisional Application No. 61/922,056 filed on Dec. 30, 2013, all of which are hereby expressly incorporated by reference into the present application.

BACKGROUND OF THE INVENTION

Field of the Invention

The present invention relates to mobile communication.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", 3GPP LTE/LTE-A may divide the physical channel into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

Meanwhile, in recent years, research into communication between devices or the device and a server without human interaction, that is, without human intervention, that is, machine type communication (MTC) has been actively conducted. The MTC represents a concept in which not a terminal used by human but a machine performs communication by using the existing wireless communication network.

Since MTC has a feature different from communication of a normal UE, a service optimized to MTC may differ from a service optimized to human-to-human communication. In comparison with a current mobile network communication service, MTC can be characterized as a different market scenario, data communication, less costs and efforts, a potentially great number of MTC devices, wide service areas, low traffic for each MTC device, etc.

Recently, it is considered to extend cell coverage of a BS for an MTC device, and various schemes for extending cell coverage are under discussion. However, when the cell coverage is extended, if the BS transmits a downlink channel to the MTC device located in the coverage extension region as if transmitting a downlink channel to a normal UE, the MTC device has difficulty in receiving the channel. Likewise, when the MTC device located in the coverage enhancement region transmits an uplink channel to the BS in a usual way, the BS may have difficulty in receiving the uplink channel. In particular, the BS may have difficulty in receiving a physical random access channel (PRACH) among uplink channels due to characteristics thereof.

SUMMARY OF THE INVENTION

Technical Objects

Accordingly, the disclosure of the specification has been made in an effort to solve the problem.

Technical Solutions

In order to achieve the above-described object, there is provided a method for performing a random access procedure. The method may be performed by a MTC (Machine Type Communication) device being located in a coverage enhancement region. The method may comprise: determining a PRACH resource for a random access preamble based on a repetition level; generating the random access preamble toward a specific cell; and repeatedly transmitting the generated random access preamble in accordance with the repetition level within the decided PRACH resource.

The PRACH resource may determined by a transmission period corresponding to the random access preamble and a start timing of the random access preamble within the transmission period Herein, the transmission period and the start timing of the random access preamble may be independently configured in accordance with the repetition level.

Additionally, the PRACH resource is determined by a first period, a second period, and an offset. Herein, The first period corresponds to a period between the transmission periods corresponding to the random access preamble. The second period corresponds to a period between start timings of the random access preamble within the transmission period. The offset corresponds to a time difference between a start timing of the transmission period and a start timing of the random access preamble.

The first period, the second period, and the offset are configured in the MTC device through a higher layer signal sent from a base station.

Additionally, the first period, the second period, and the offset are configured in the MTC device through a system information block (SIB).

Most particularly, the second period or the offset is independently configured in accordance with the repetition level.

Additionally, the PRACH resource is determined through a PRACH configuration index.

Additionally, wherein a preamble format corresponding to the random access preamble is determined based on the repetition level.

In order to achieve the above-described object, there is provided a machine type communication (MTC) device for performing a random access procedure in a coverage enhancement region. The MTC device may comprise: a transceiver configured to transmit a random access preamble toward a specific cell; and a processor configured to determine a PRACH resource for the random access preamble based on a repetition level, and control the transceiver so as to repeatedly transmit the random access preamble in accordance with the repetition level within the decided PRACH resource.

Effects of the Invention

According to the disclosure of this specification, the above-described technical problems of the related art are resolved. More specifically, according to the disclosure of this specification, due to the enhancement of the reception performance and decoding performance of the base station with respect to the MTC device, which is located in the coverage enhancement region of the base station, there is an advantage in that an efficient and excellent random access procedure can be performed.

BRIEF DESCRIPTION OF THE DRAWINGS

FIG. 6 illustrates a structure of an uplink subframe in 3GPP LTE.

DESCRIPTION OF EXEMPLARY EMBODIMENTS

Figure 1:
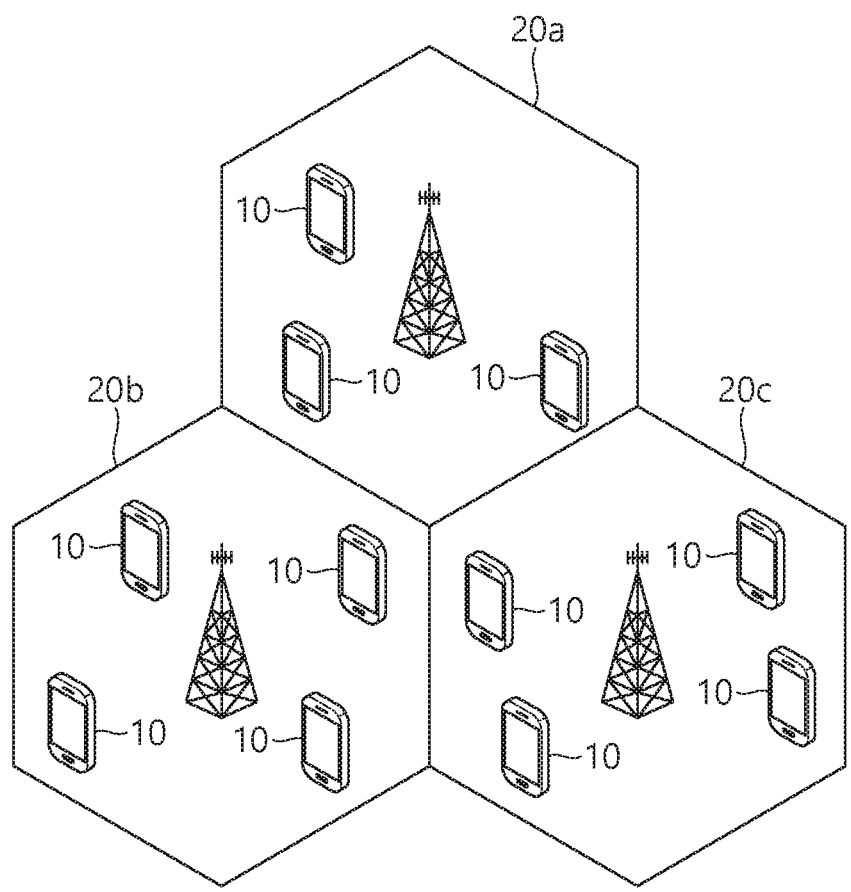
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belongs is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
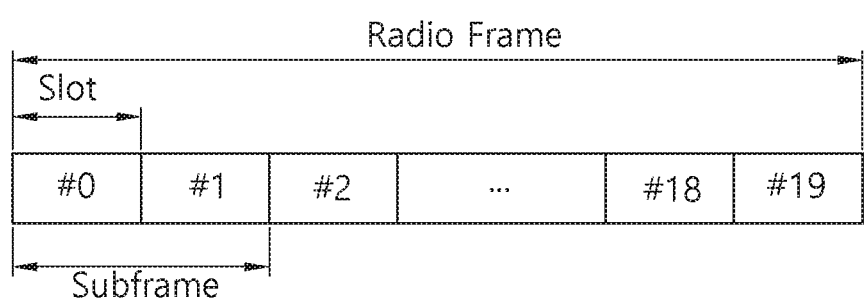
FIG. 2 illustrates a structure of a radio frame according to frequency division duplex (FDD) of 3rd generation partnership project (3GPP) long term evolution (LTE).

FIG. 2 Illustrates a Structure of a Radio Frame According to FDD of 3rd Generation Partnership Project (3GPP) Long Term Evolution (LTE).

The radio frame of FIG. 2 may be found in the section 5 of 3GPP TS 36.211 V 10.4.0 (2011-12) "Evolved Universal Terrestrial Radio Access (E-UTRA); Physical Channels and Modulation (Release 10)".

The radio frame includes 10 subframes indexed 0 to 9. One subframe includes two consecutive slots. Accordingly, the radio frame includes 20 slots. The time taken for one subframe to be transmitted is denoted TTI (transmission time interval). For example, the length of one subframe may be 1 ms, and the length of one slot may be 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
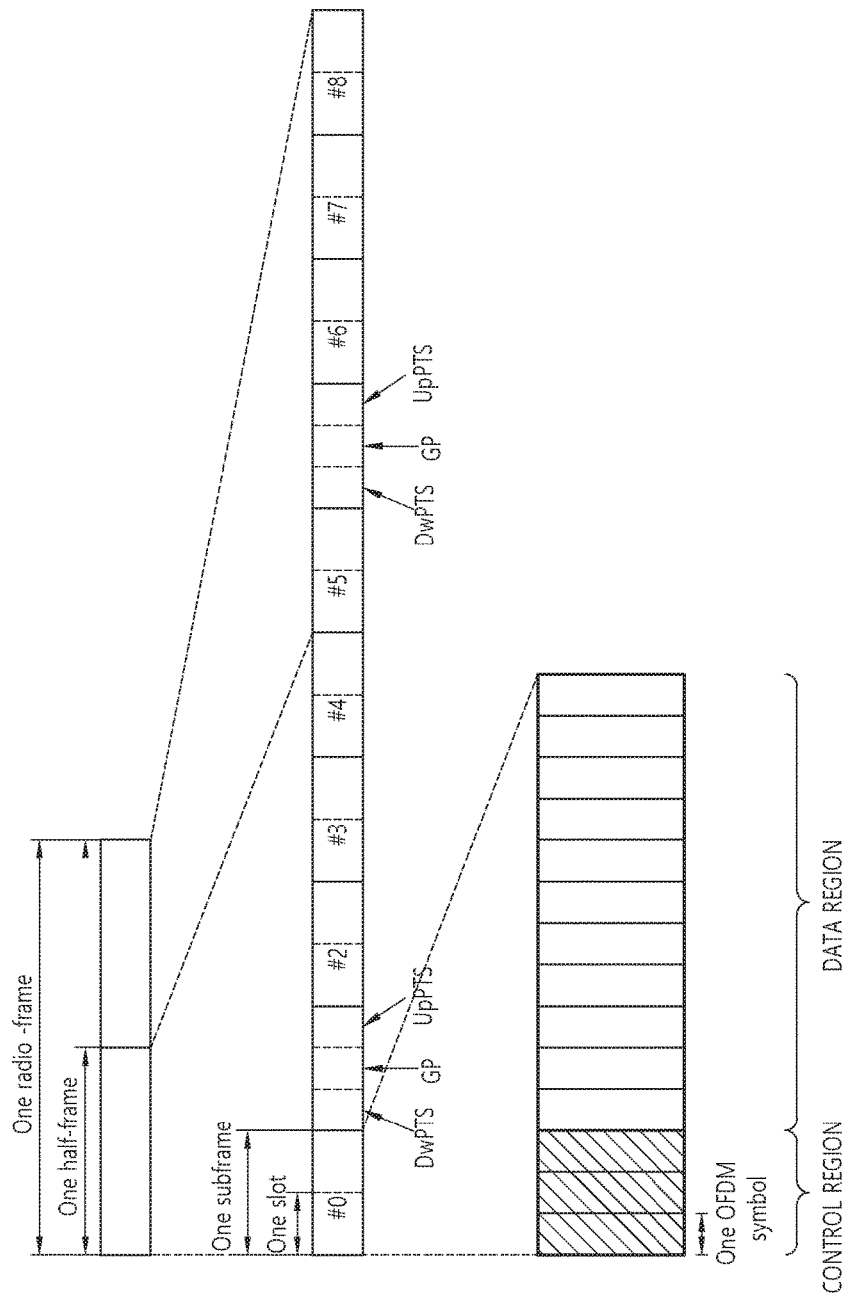
FIG. 3 illustrates a structure of a downlink radio frame according to time division duplex (TDD) in 3GPP LTE.

FIG. 3 Illustrates a Structure of a Downlink Radio Frame According to TDD in 3GPP LTE.

For this, 3GPP TS 36.211 V 10.4.0 (2011-23) "Evolved Universal Terrestrial Radio Access (E-UTRA); Physical Channels and Modulation (Release 8)", Ch. 4 may be referenced, and this is for TDD (time division duplex).

Subframes having index #1 and index #6 are denoted special subframes, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) subframe and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe,
'U' a UL subframe,
and 'S' a special subframe.
When receiving a UL-DL configuration from the base station, the terminal may be aware of whether a subframe is a DL subframe or a UL subframe according to the configuration of the radio frame.

Figure 4:
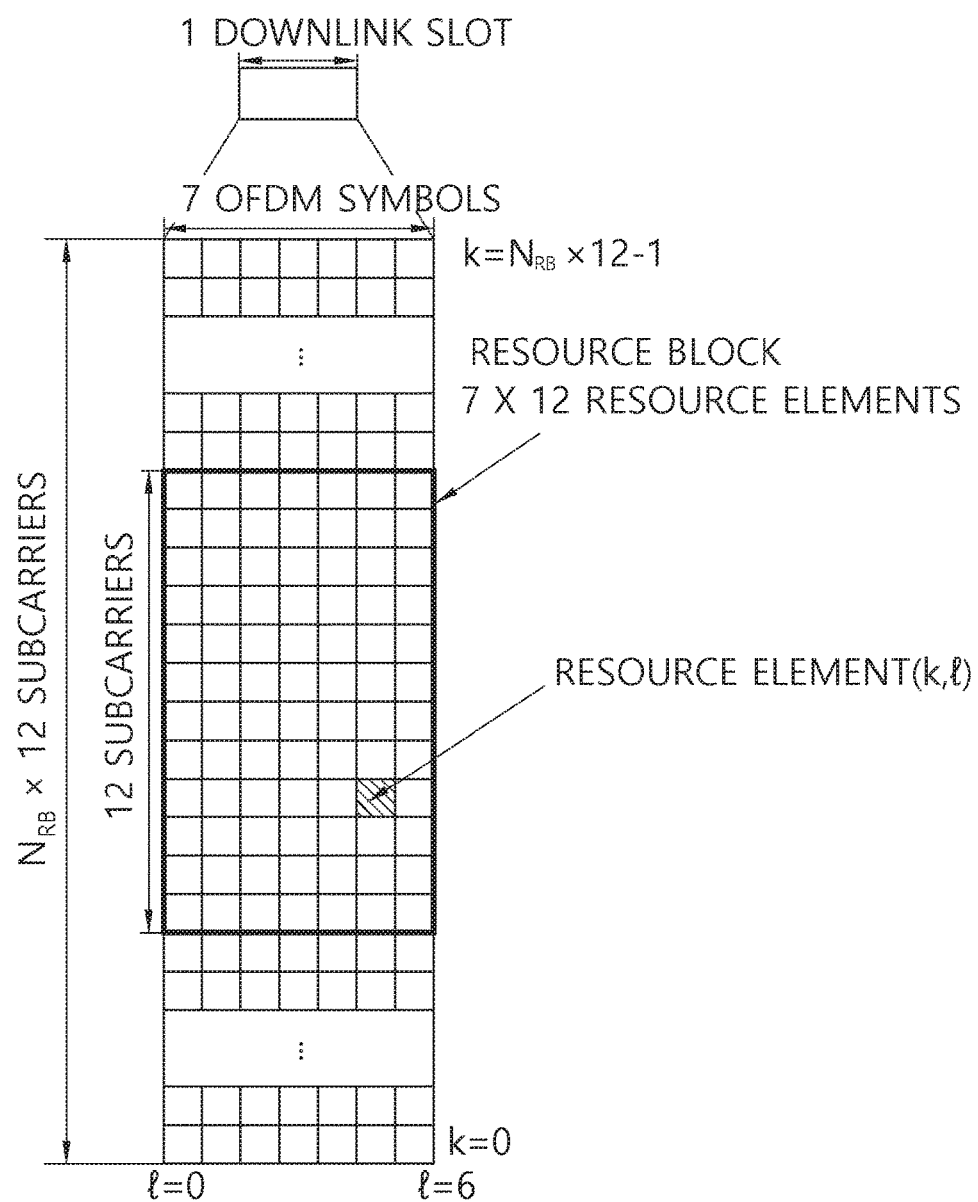
FIG. 4 illustrates an example of a resource grid for one uplink or downlink slot in 3GPP LTE.

FIG. 4 Illustrates an Example of a Resource Grid for One Uplink or Downlink Slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Figure 5:
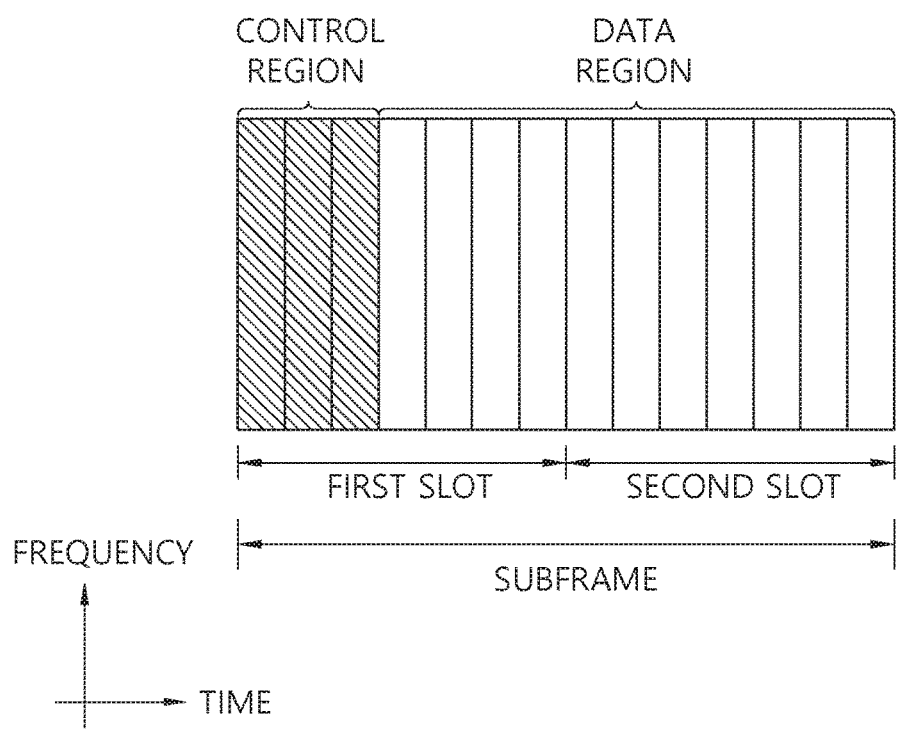
FIG. 5 illustrates a structure of a downlink subframe.

FIG. 5 Illustrates a Structure of a Downlink Subframe.

In FIG. 5, assuming the normal CP, one slot includes seven OFDM symbols, by way of example.

The DL (downlink) subframe is split into a control region and a data region in the time domain. The control region includes up to first three OFDM symbols in the first slot of the subframe. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the subframe carries CIF (control format indicator) regarding the number (i.e., size of the control region) of OFDM symbols used for transmission of control channels in the subframe. The wireless device first receives the CIF on the PCFICH and then monitors the PDCCH.

Unlike the PDCCH, the PCFICH is transmitted through a fixed PCFICH resource in the subframe without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first subframe of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Meanwhile, a UE is unable to know that the PDCCH of its own is transmitted on which position within control region and using which CCE aggregation level or DCI format. Since a plurality of PDCCHs may be transmitted in one subframe, the UE monitors a plurality of PDCCHs in every subframe. Here, the monitoring is referred to try to decode the PDCCH by the UE according to the PDCCH format.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

TABLE 2

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
|  | DCI format 1 | Terminal specific | Single antenna port, port 0 |
| Transmission mode 2 | DCI format 1A | Public service and terminal specific | Transmit diversity |
|  | DCI format 1 | Terminal specific | Transmit diversity |
| Transmission mode 3 | DCI format 1A | Public service and terminal specific | Transmit diversity |
|  | DCI format 2A | Terminal specific | CDD (Cyclic Delay Diversity) or transmit diversity |
| Transmission mode 4 | DCI format 1A | Public service and terminal specific | Transmit diversity |
|  | DC1 format 2 | Terminal specific | Closed-loop spatial multiplexing |

TABLE 2-continued

| Transmission mode | DCI format | Search space | Transmission mode of PDSCH according to PDCCH |
|---|---|---|---|
| Transmission mode 5 | DCI format 1A | Public service and terminal specific | Transmit diversity |
| | DCI format 1D | Terminal specific | MU-MIMO (Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmission mode 7 | DCI format 1A | Public service and terminal specific | If the number of PBCH transmisison ports is 1, single antenna port, port 0. Otherwise, transmit diversity |
| | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN subframe: if the number of PBCH antenna ports is 1, port 0 is used as independent antenna port. Otherwise, transmit Diversity<br>MBSFN subframe: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN subframe: if the number of PBCH antenna ports is 1, port 0 is used as independent antenna port. Otherwise, transmit Diversity<br>MBSFN subframe: port 7 as independent antenna port |
| | DCI format 2D | Terminal specific | 8 transmisison layers, ports 7-14 are used or port 7 or 8 is used as independent antenna port |

The usage of the DCI format is classified as shown in Table 3 below.

TABLE 3

| DCI format | Contents |
|---|---|
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

For example, DCI format 0 includes fields listed in the following table with reference to section 5.3.3.1.1 of 3GPP TS 36.212 V10.2.0 (2011-06).

TABLE 4

| Field | Number of bits |
|---|---|
| Carrier indicator | 0 or 3 bits |
| Flag for format0/format1A differentiation | 1 bit |
| FH (Frequency hopping) flag | 1 bit |
| Resource block assignment and hopping resource allocation | |
| MCS (Modulation and coding scheme) and RV (redundancy version) | 5 bits |
| NDI (New data indicator) | 1 bit |
| TPC | 2 bits |
| Cyclic shift for DM RS and OCC index | 3 bits |
| UL index | 2 bits |
| DAI (Downlink Assignment Index) | 2 bit |
| CSI request | 1 or 2 bits |
| SRS request | 0 or 1 bits |
| Resource allocation type | 1 bit |

FIG. 6. Illustrates a Structure of an Uplink Subframe in 3GPP LTE.

Referring to FIG. 6, an uplink subframe may be divided into a control region and a data region in a frequency domain. The control region is allocated a PUCCH for transmission of uplink control information. The data region is allocated a PUSCH for transmission of data (along with control information in some cases).

A PUCCH for one UE is allocated a RB pair in a subframe. RBs in the RB pair take up different subcarriers in each of first and second slots. A frequency occupied by the RBs in the RB pair allocated to the PUCCH changes with respect to a slot boundary, which is described as the RB pair allocated to the PUCCH having been frequency-hopped on the slot boundary.

A UE transmits uplink control information through different subcarriers according to time, thereby obtaining a frequency diversity gain. m is a location index indicating the logical frequency-domain location of an RB pair allocated for a PUCCH in a subframe.

Uplink control information transmitted on a PUCCH may include a HARQ ACK/NACK, a channel quality indicator (CQI) indicating the state of a downlink channel, a scheduling request (SR) which is an uplink radio resource allocation request, or the like.

A PUSCH is mapped to a uplink shared channel (UL-SCH) as a transport channel. Uplink data transmitted on a PUSCH may be a transport block as a data block for a UL-SCH transmitted during a TTI. The transport block may be user information. Alternatively, the uplink data may be multiplexed data. The multiplexed data may be the transport block for the UL-SCH multiplexed with control information. For example, control information multiplexed with data may include a CQI, a precoding matrix indicator (PMI), an HARQ, a rank indicator (RI), or the like. Alternatively, the uplink data may include only control information.

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

As described above, the carrier aggregation system may support a plurality of component carriers (CCs), that is, a plurality of serving cells, unlike a single carrier system.

The carrier aggregation system may support cross-carrier scheduling. Cross-carrier scheduling is a scheduling method for performing resource allocation for a PDSCH transmitted through a different component carrier through a PDCCH transmitted through a specific component carrier and/or resource allocation for a PUSCH transmitted through a component carrier different from a component carrier basically linked with the specific component carrier.

Figure 7:
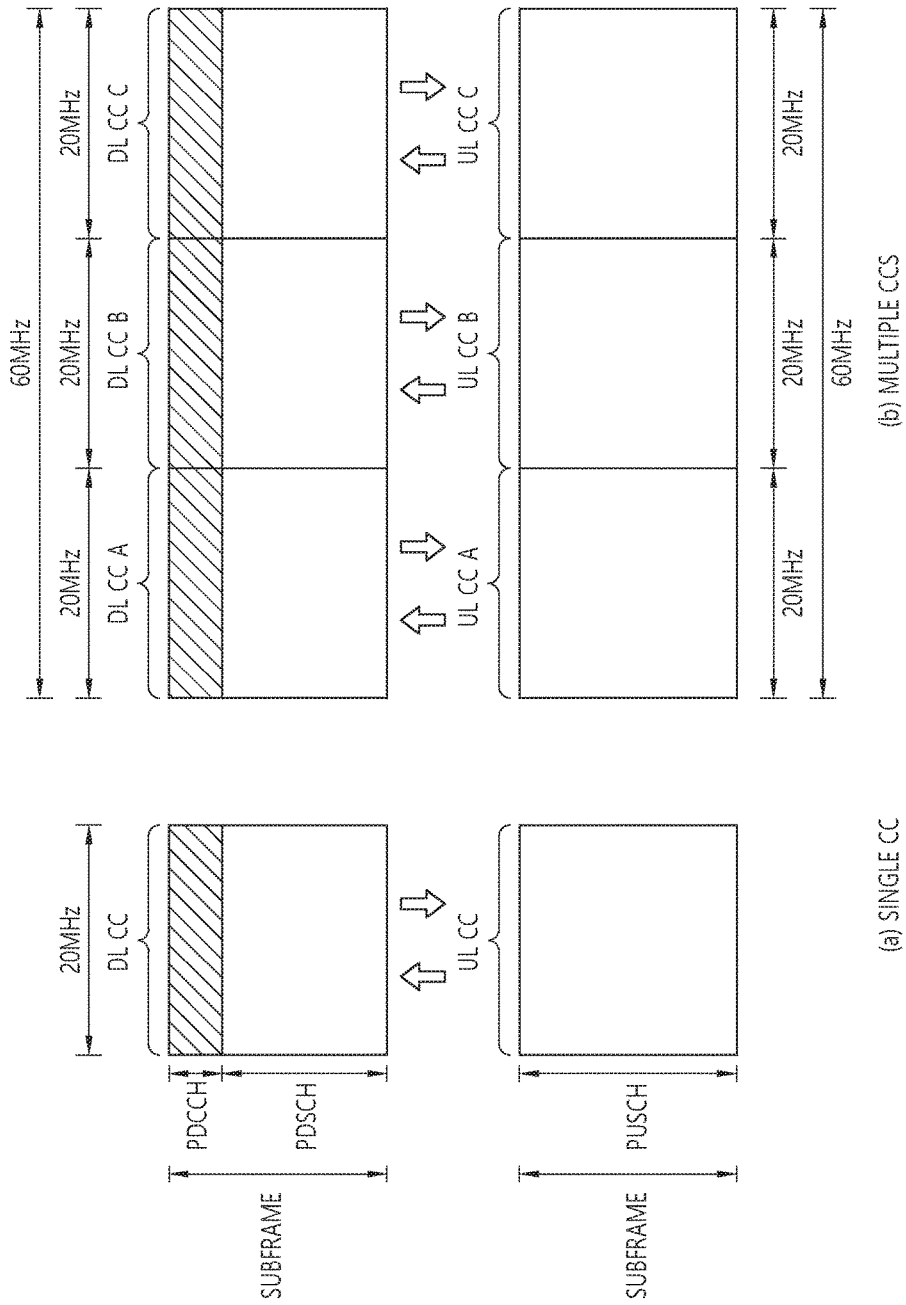
FIG. 7 illustrates an example of comparison between a single carrier system and a carrier aggregation system.

FIG. 7 Illustrates an Example of Comparison Between a Single Carrier System and a Carrier Aggregation System.

Referring to (a) of FIG. 7, the single carrier system supports only one carrier for an uplink and a downlink for a UE. Although there may be various bandwidths of carriers, a UE is assigned one carrier. Referring to (b) of FIG. 7, the carrier aggregation (CA) system may assign a plurality of component carriers (DL CC A to C and UL CC A to C) for a UE. A component carrier (CC) denotes a carrier used in the carrier aggregation system and may be abbreviated to a carrier. For example, three 20-MHz component carriers may be assigned to allocate a 60-MHz bandwidth for the terminal.

Carrier aggregation systems may be divided into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both a case where component carriers are contiguous and a case where component carriers are non-contiguous. Different numbers of component carriers may be aggregated for a downlink and an uplink. A case where the number of downlink component carriers and the number of uplink component carriers are the same is referred to as symmetric aggregation, and a case where the numbers are different is referred to as asymmetric aggregation.

When one or more component carriers are aggregated, component carriers to be aggregated may use the same bandwidths as adopted in an existing system for backward compatibility with the existing system. For example, the 3GPP LTE system supports bandwidths of 1.4 MHz, 3 MHz, 5 MHz, 10 MHz, 15 MHz, and 20 MHz, and the 3GPP LTE-A system may configure a broad band of 20 MHz or more only using the bandwidths of the 3GPP LTE system. Alternatively, instead of using the bandwidths of the existing system, new bandwidths may be defined to configure a broad band.

In order to transmit/receive packet data through a specific secondary cell in carrier aggregation, a UE first needs to complete configuration for the specific secondary cell. Here, configuration means that reception of system information necessary for data transmission/reception in a cell is completed. For example, configuration may include an overall process of receiving common physical-layer parameters necessary for data transmission and reception, media access control (MAC)-layer parameters, or parameters necessary for a specific operation in an RRC layer. A configuration-completed cell is in a state where packet transmission and reception is immediately possible upon receiving information indicating packet data may be transmitted.

A configuration-completed cell may be in an activated or deactivated state. Here, the activated state means that the cell performs data transmission or reception or is ready for data transmission or reception. A UE may monitor or receive a control channel (PDCCH) and a data channel (PDSCH) of an activated cell in order to identify resources (which may be a frequency or time) assigned thereto.

The deactivated state means that transmission or reception of traffic data is impossible and measurement or transmission/reception of minimal information is possible. A UE may receive system information (SI) necessary for receiving a packet from a deactivated cell. However, the UE does not monitor or receive a control channel (PDCCH) and data channel (PDSCH) of the deactivated cell in order to identify resources (which may be a frequency or time) assigned thereto.

Figure 8:
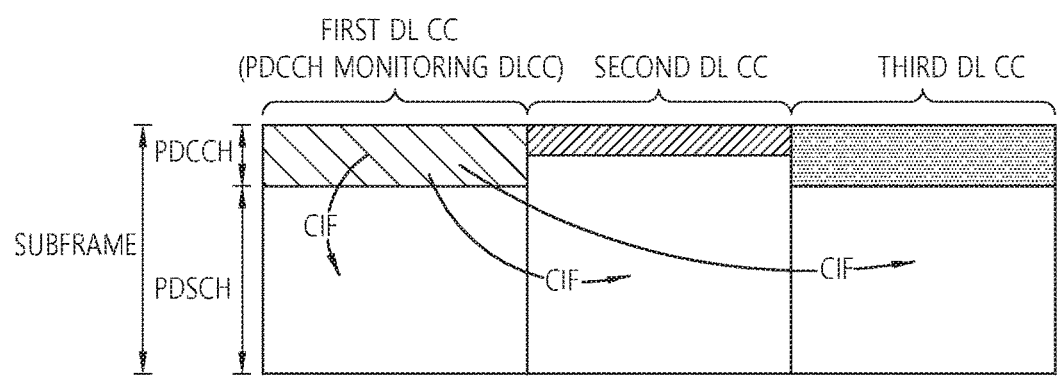
FIG. 8 illustrates cross-carrier scheduling in a carrier aggregation system.

FIG. 8 Illustrates Cross-carrier Scheduling in a Carrier Aggregation System.

Referring to FIG. 8, a BS may configure a PDCCH monitoring DL CC (monitoring CC) set. The PDCCH monitoring DL CC set includes some of all aggregated DL CCs, and a UE performs PDCCH monitoring/decoding only on a DL CC included in the PDCCH monitoring DL CC set when cross-carrier scheduling is configured. That is, the BS transmits a PDCCH with respect to a PDSCH/PUSCH to be scheduled only through a DL CC included in the PDCCH monitoring DL CC set. The PDCCH monitoring DL CC set may be configured to be UE-specific, UE group-specific, or cell-specific.

FIG. 8 illustrates an example in which three DL CCs (DL CC A, DL CC B, and DL CC C) are aggregated and DL CC A is set as a PDCCH monitoring DL CC. A UE may receive a DL grant with respect to a PDSCH of DL CC A, DL CC B, and DL CC C through a PDCCH of DL CC A. DCI transmitted through the PDCCH of DL CC A includes a CIF to indicate which DL CC the DCI is about.

Hereinafter, a general random access procedure will be described. A random access procedure is used by a UE to achieve uplink synchronization with a BS or to be assigned an uplink radio resource. A random access procedure may be divided into contention-based random access and contention-free or non-contention-based random access.

Figure 9A:
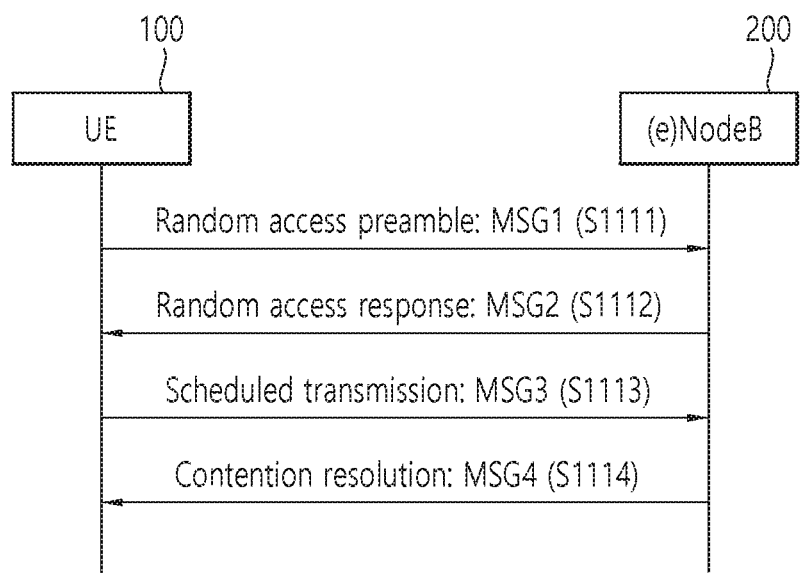
FIG. 9a illustrates a contention-based random access procedure.

FIG. 9a Illustrates a Contention-based Random Access Procedure.

Referring to FIG. 9a, a UE 100 randomly selects one random access preamble in a random access preamble set indicated through system information or a handover command. The UE 100 selects a radio resource for transmitting the random access preamble to transmit the selected random access preamble (message 1: Msg 1, S1111). The radio resource may be a specific subframe, and selecting the radio resource may be selecting a physical random access channel (PRACH).

After transmitting the random access preamble, the UE 100 attempts to receive a random access response (RAR) within an RAR window indicated through the system information or handover command and accordingly receives an RAR (message 2: Msg 2, S1112). The RAR may be transmitted in a MAC protocol data unit (PDU) format.

The RAR may include a random access preamble identifier (ID), a UL grant (uplink radio resource), a temporary cell-radio network temporary identifier (C-RNTI), and a synchronization adjustment command (for example, a timing advance command (TAC)). Since one RAR may include RAR information for one or more UEs 100, a random access preamble ID may be included to indicate a UE 100 for which a UL grant, a temporary C-RNTI, and a synchronization adjustment command (for example, a TAC) are valid. The random access preamble ID may be an ID of a random access preamble received by an eNodeB 200. The synchronization adjustment command (for example, a TAC) may be included as information for the UE 100 to adjust uplink synchronization. The RAR may be indicated by a random access ID on a PDCCH, that is, a random access-radio network temporary identifier (RA-RNTI).

When the UE 100 receives the RAR valid therefor, the UE 100 processes information included in the RAR and performs scheduled transmission (message 3: Msg 3) to the eNodeB 200. That is, the UE 100 applies the synchronization adjustment command (for example, a TAC) and stores the temporary C-RNTI. Further, the UE 100 transmits data stored in a buffer of the UE 100 or newly generated data to the eNodeB 200 using the UL grant. In this case, information to identify the UE 100 needs to be included, which is for identifying the UE 100 in order to avoid contention since the eNodeB 200 does not judge which UEs 100 perform random access in the contention-based random access procedure.

The UE 100 transmits a scheduled message (that is, Msg 3) including an ID of the UE 100 through a radio resource assigned through the UL grant included in the RAR and waits for an instruction (message 4: Msg 4) from the eNodeB 200 to avoid contention (S1114). That is, the UE 100 attempts to receive a PDCCH in order to a specific message.

Figure 9B:
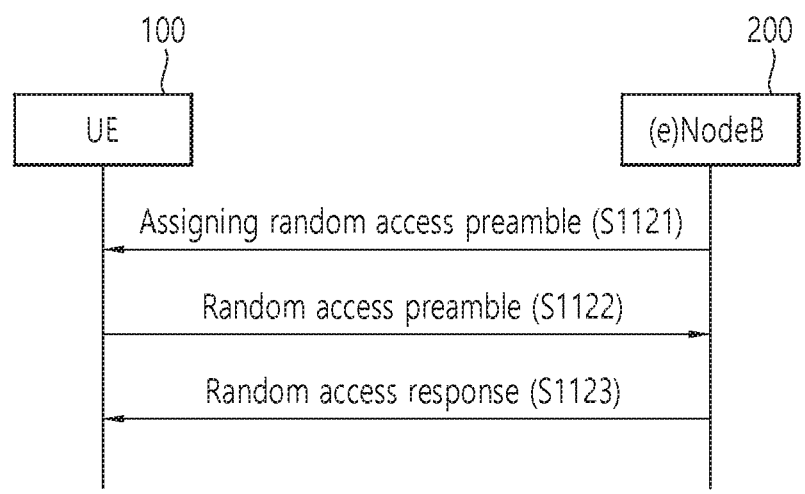
FIG. 9b illustrates a non-contention-based random access procedure.

FIG. 9b Illustrates a Non-contention-based Random Access Procedure.

Unlike contention-based random access, non-contention-based random access may be finished when a UE 100 receives an RAR.

Non-contention-based random access may be initiated by a request, such as a handover and/or a command from an eNodeB 200. Here, in the foregoing two cases, contention-based random access may also be performed.

The UE 100 is assigned by the eNodeB 200 a designated random access preamble having no possibility of contention. The random access preamble may be assigned through a handover command and a PDCCH command (S1121).

After being assigned the random access preamble designated for the UE 100, the UE 100 transmits the random access preamble to the eNodeB 200 (S1122).

When the random access preamble us received, the eNodeB 200 transmits an RAR to the UE 100 in response (S1123).

Hereinafter, machine-type communication (MTC) will be described.

Figure 10A:
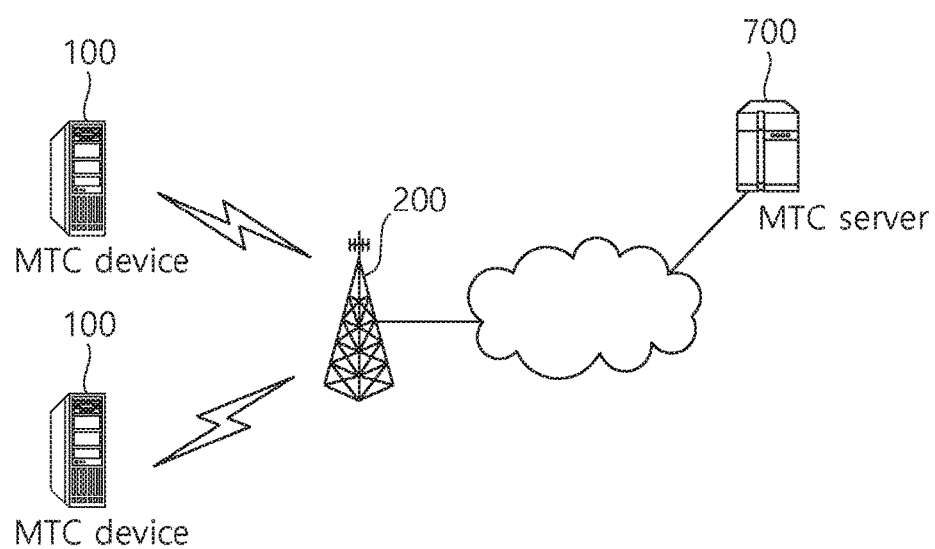
FIG. 10a illustrates an example of machine-type communication (MTC).

FIG. 10a Illustrates an Example of MTC.

MTC refers to an information exchange between MTC devices 100 via a BS 200 or information exchange between an MTC device 100 and an MTC server 700 via a BS without involving human interactions.

The MTC server 700 is an entity to communicate with the MTC device 100. The MTC server 700 runs an MTC application and provides the MTC device with an MTC-specific service.

The MTC device 100 is a wireless device to provide MTC communication, which may be stationary or mobile.

Services provided through MTC are differentiated from existing communication services involving human intervention and an MTC service range is wide, for example, tracking, metering, payment, medical services, remote control, or the like. More specifically, examples of MTC services may include reading a meter, measuring a water level, utilizing a surveillance camera, inventory reporting of a vending machine, etc.

The MTC device is characterized in that a transmission data amount is small and uplink/downlink data transmission/reception occurs sometimes. Therefore, it is effective to decrease a unit cost of the MTC device and to decrease battery consumption according to a low data transmission rate. The MTC device is characterized by low mobility and thus has a channel environment that hardly changes.

Figure 10B:
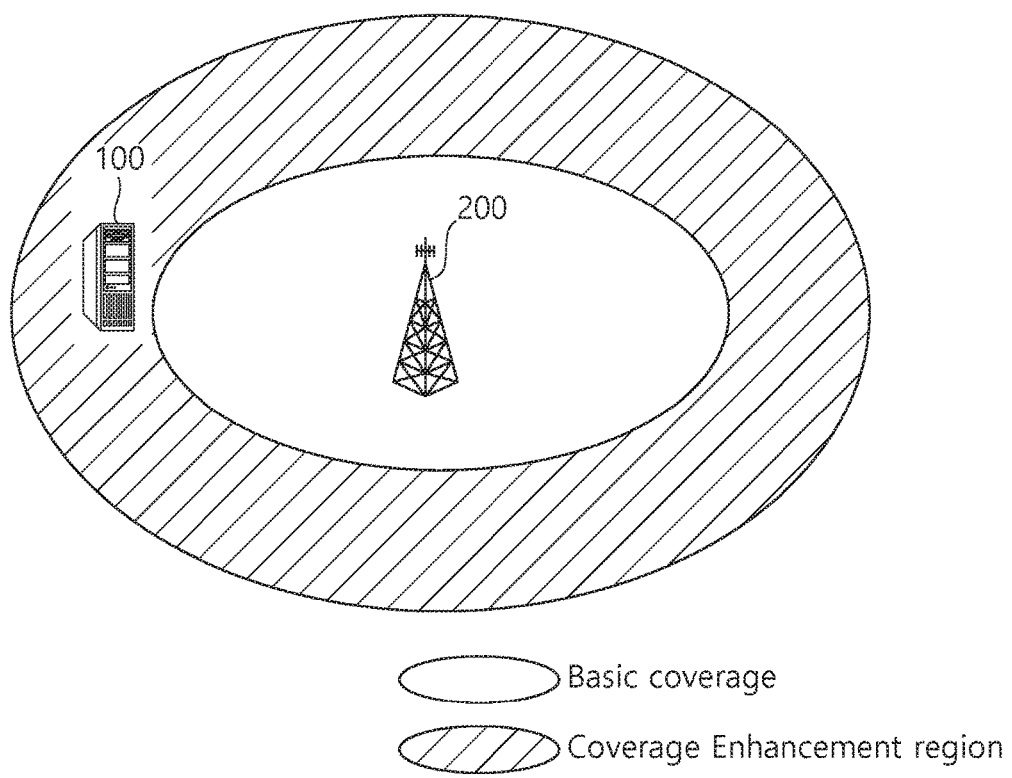
FIG. 10b illustrates an example of cell coverage enhancement for an MTC device.

FIG. 10b Illustrates an Example of Cell Coverage Enhancement for an MTC Device.

Recently, extension of cell coverage of a BS is considered for an MTC device 100, and various schemes for extending cell coverage are under discussion.

However, when the cell coverage is extended, if the BS transmits a PDSCH and a PDCCH including scheduling information on the PDSCH to an MTC device located in the coverage enhancement region as if transmitting the PDSCH and the PDCCH to a normal UE, the MTC device has difficulty in receiving the PDSCH and the PDCCH.

Likewise, when the MTC device located in the coverage enhancement region transmits a physical random access channel (PRACH or a PRACH preamble) to the BS in a usual way, the BS may have difficulty in receiving the PRACH transmitted from the MTC device.

In order to achieve the objects for resolving the above-described technical problems, in case the MTC device 100, which is located in the coverage enhancement region, transmits a PRACH to the base station, a plurality of preambles may be transmitted by being repeated at a specific repetition level.

For example, in case the MTC device 100 is positioned in a location where the reception signal is weak (e.g., a cell coverage enhancement region), such as under a bridge, underground, and so on, according to a disclosure of this specification, the MTC device 100 may be transmitted by performing repetition of a random access preamble.

Herein, depending on a level of necessity, a plurality of repetition levels may be taken into consideration for the repetition level.

<Disclosures of This Specification>

Meanwhile, in the legacy 3GPP LTE Re-11 system, the PRACH was capable of being transmitted over a maximum of 3 subframes depending on the preamble format, and a point where the PRACH transmission can be started was set up in accordance with a PRACH configuration index.

Although the point where the PRACH transmission can be started (or PRACH resource) has a cycle period (or period) of up to 20 msec depending on the configuration, when considering a repeated transmission on the PRACH over multiple subframes, as performed in the next generation system, the above-described method or period configuration method may not be adequate.

Accordingly, in case of adopting multiple repetition levels on the PRACH, the transmission timing of the PRACH as well as the allocation of the PRACH resource, and the generation method of a preamble sequence may have to be changed in accordance with the repetition level.

The disclosures of this specification propose a method for transmitting a PRACH as well as a method for performing a random access procedure that can operate by using a set of multiple parameters, such as repetition levels.

According to a disclosure of this specification, in allocating or configuring PRACH resources, resources through which information on a PRACH transmission time and a repeated PRACH preamble may be transmitted or are to be transmitted, may be separately designated.

This method may include a method of designating a resource through which a repeated preamble can be transmitted and designating a portion of the corresponding resource as a PRACH transmission starting point.

A method of performing a random access procedure according to a disclosure of this specification may include deciding a PRACH resource respective to a random access preamble based on a repetition level, generating a random access preamble to a specific cell, and repeatedly transmitting the generated random access preamble in accordance with the repetition level within the decided PRACH resource.

Herein, the PRACH resource may be decided by a transmission period corresponding to the random access preamble and a start timing of the random access preamble within the transmission period.

Additionally, the transmission period and the start timing of the random access preamble may be independently configured in accordance with the repetition level.

According to a disclosure of this specification, the PRACH resource may be decided by a first period, a second period, and an offset, and, herein, the first period may correspond to a period between the sections available for transmission corresponding to the random access preamble, the second period may correspond to a period between start timings of the random access preamble within the transmission period, and the offset may correspond to a time difference between a start timing of the transmission period and a start timing of the random access preamble.

Herein, the first period, the second period, and the offset may be configured in the MTC device through a higher layer signal sent from a base station.

Additionally, the first period, the second period, and the offset may be configured in the MTC device through a system information block (SIB).

Most particularly, the second period or the offset may be independently configured in accordance with the repetition level.

Additionally, the PRACH resource may be decided through a PRACH configuration index.

According to a disclosure of this specification, a preamble format corresponding to the random access preamble may be decided based on the repetition level.

Although the disclosures of this specification are described by specifying details on the multiple parameter sets with respect to the repetition levels for simplicity in the description, the scope and spirit of the present invention may also be applied to other parameter sets. For example, other parameter sets may include a PRACH format, High speed flag, and so on.

Hereinafter, although the disclosures of this specification shall be sequentially described with reference to the accompanying drawings, a first disclosure of this specification discloses a configuration solution for a starting point and transmission timing of a PRACH transmission according to multiple repetition levels, a second disclosure of this specification discloses a configuration and allocation solution for resource that can be used for a repeated PRACH transmission, and a third disclosure of this specification discloses a generation solution for a PRACH preamble sequence according to multiple parameter sets (including repetition levels).

I. First Disclosure of This Specification

As described above, the first disclosure of this specification presents a configuration solution for a starting point and transmission timing of a PRACH transmission according to multiple repetition levels. More specifically, the first disclosure provides a configuration solution from which the PRACH transmission according to multiple parameter sets can be started (or initiated).

According to the first disclosure of this specification, a PRACH transmission group, which is configured of a single repetition level or multiple repetition levels, may be essentially configured. For example, a first group may have Repetition Level 0 (e.g., the number of PRACH repetitions is equal to 3) or Repetition Level 1 (e.g., the number of PRACH repetitions is equal to 4), and a second group may have Repetition Level 1 or Repetition Level 2 (e.g., the number of PRACH repetitions is equal to 5).

In this case, a subframe from which the PRACH transmission can be started may be independently configured for each corresponding group. This may be used for the purpose of performing TDM (Time Division Multiplexing) between PRACHs having different repetition levels.

In case TDM between PRACHs having different repetition levels is not performed, the group may be expressed in a format including all repetition levels being available for configuration.

In this case, the PRACHs respective to different repetition levels may be differentiated from one another by FDM (Frequency Division Multiplexing) or CDM (Code Division Multiplexing).

The configuration solution for a starting point of the PRACH transmission according to the first disclosure is as described below.

Configuration Solution 1-1

According to Configuration Solution 1-1, the PRACH resource having the fastest time point may be configured as the starting point for each period of a pre-designated frame unit respective to the PRACH.

The period of the pre-designated frame unit may be configured based on a repetition level having the longest period among the repetition levels, and the PRACH resource may be configured as a resource respective to the PRACH corresponding to the corresponding repetition level.

Most particularly, Configuration Solution 1-1 may correspond to a solution for configuring a subframe from which the transmission of the PRACH can be started as the subframe having the fasted time point for each frame unit period respective to a pre-determined PRACH.

Configuration Solution 1-2

Configuration Solution 1-2 presents a solution for configuring a SFN (System Frame Number) and a subframe index through a SIB and for designating a PRACH transmission starting point in accordance with the SFN and subframe set.

More specifically, the SFN may be expressed as a bitmap format that is repeated in accordance with a pre-configured period or a specific period that is configured in the SIB. For example, in case the period is equal to 10 msec (10 subframes), when configuring the PRACH transmission starting point for each SFN having an even index, the bitmap may be set to "10101010".

Configuration Solution 1-3

Configuration Solution 1-3 presents a solution for configuring a first period, a second period, and an offset in a SIB and for deciding a PRACH transmission starting point by using a combination of the first period, the second period, and the offset.

As an example of a more detailed method, as a purpose of supporting a burst transmission (e.g., a situation where a plurality of repeated PRACHs is transmitted at the same time point or at similar time points), the first period is expressed as a period respective to a section available for PRACH transmission (or section not available for PRACH transmission), the second period is expressed as a period between PRACH transmission starting points, and the offset may be used for the purpose of performing TDM respective to the PRACH that corresponds to the entire repetition levels or part of the repetition levels.

Most particularly, the second period or the offset may be separately configured with respect to each repetition level.

Figure 11:
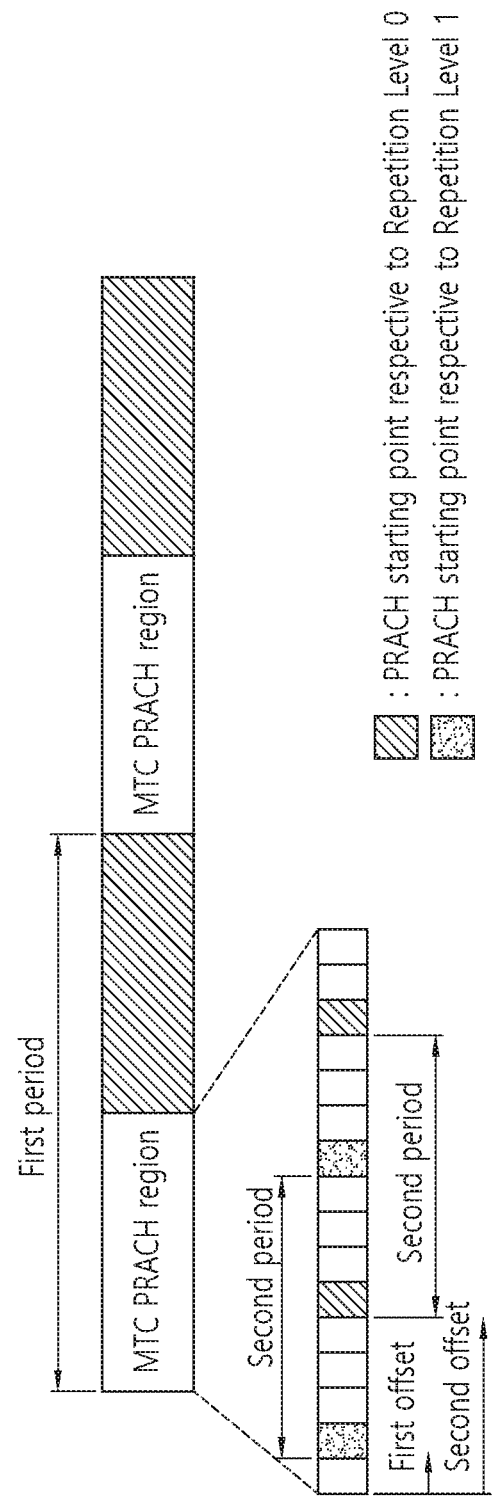
FIG. 11 illustrates an exemplary view showing a configuration solution for a transmission start timing of a PRACH preamble according to a first disclosure of this specification.

FIG. 11 Illustrates an Exemplary View Showing a Configuration Solution for a Transmission Start Timing of a PRACH Preamble According to a First Disclosure of this Specification.

Referring to FIG. 11, the first period represents a period between MTC PRACH regions, which correspond to sections that are authorized or available for the repeated PRACH transmission from the MTC device.

Additionally, the second period represents a period between timings (PRACH start timings) that are authorized or available for configuration as the PRACH transmission starting point within the MTC PRACH region.

Additionally, the offset may signify the offset value of the PRACH transmission starting point respective to each repetition level, which is applied based on the PRACH start timing.

More specifically, the method for performing the random access procedure according to Configuration Solution 1-3 may decide a PRACH resource respective to a random access preamble based on a repetition level and may repeatedly transmit the random access preamble in accordance with the repetition level based on the PRACH resource, and a method of deciding the PRACH resource by using a first period, a second period, and an offset is applied herein.

Herein, the first period may correspond to a period between the sections available for transmission corresponding to the random access preamble, the second period may correspond to a period between start timings of the random access preamble within the transmission period, and the offset may correspond to a time difference between a start timing of the transmission period and a start timing of the random access preamble.

Additionally, the first period, the second period, and the offset may be configured in the MTC device through a higher layer signal sent from a base station.

Additionally, the first period, the second period, and the offset may be configured in the MTC device through a system information block (SIB).

Most particularly, the second period or the offset may be independently configured in accordance with the repetition level.

Configuration Solution 1-4

Configuration Solution 1-4 proposes a method for configuring a table respective to the PRACH resource configuration in a redefined or extended format and for notifying the corresponding configuration index through a SIB.

Table 5 corresponds to a table related to random access configuration respective to Random access configuration in Frame structure type 1.

TABLE 5

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |

TABLE 5-continued

| PRACH Configuration Index | Preamble Format | System frame number | Subframe number |
|---|---|---|---|
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

For example, as shown in Table 5, as opposed to the maximum period respective to the PRACH starting point being equal to 20 msec and options even/any being selected for the SFN in the legacy 3GPP LTE Rel-11 system, Configuration Solution 1-4 proposes a solution for further extending the maximum period respective to the PRACH starting point (e.g., to 40 msec, which is longer than 20 msec) and for expressing the SFN as even/odd/any, and so on, or expressing the SFN as an offset format (mod value) for each period.

II. Second Disclosure of This Specification

As described above, the second disclosure of this specification provides a configuration and allocation solution for resource that can be used for a repeated PRACH transmission. More specifically, the second disclosure of this specification provides a resource configuration solution that can be used for the repeated PRACH transmission.

In repeatedly transmitting the PRACH, the allocation of resources may be configured with respect to contiguous subframes, or the allocation of resources may be configured with respect to non-contiguous subframes based on the resource distribution efficiency.

As the method for configuring resources respective to non-contiguous subframes, a method of configuring resources that are designated in the PRACH resource configuration may be considered.

For example, in case the PRACH resource configuration allocates the first subframe of each frame as the PRACH resource, the PRACH having the transmission repeated 10 times may be transmitted from each first subframe throughout 10 subframes.

Additionally, based upon the multiplexing between PRACHs with respect to the repetition levels, the resources that are to be used for the PRACH transmission may each be independently allocated for TDM, or, considering the CDM, the resources may also be allocated as common resources.

In this case, the resource configuration unit that is to be used for the repeated PRACH transmission may be independently configured for each repetition level. In case the resources overlap, the resources may be differentiated from one another by CDM.

Additionally, the resource configuration unit that is to be used for the PRACH transmission may be commonly configured with respect to the MTC device. However, in case TDM is performed between repetition levels, the above-described PRACH transmission starting point configuration solution may be applied.

The method for configuring resources with respect to repeated PRACHs is as described below.

Configuration Solution 2-1

Configuration Solution 2-1 proposes a solution for signaling a PRACH resource index from a higher layer and for configuring the signaled resource as the resource that may be used for the repeated transmission respective to the region excluding the corresponding resource.

Configuration Solution 2-2

Configuration Solution 2-2 proposes a solution for configuring and allocating resource that may be used for the PRACH transmission by using the bitmap format or the RIV (Resource Indication Value) format or the method performed in the Clustered resource allocation.

For example, the RIV configuration may be realized by Equation 1 shown below.

$$\text{if } (L_{CSFs}-1) \leq \lfloor N_{SF}/2 \rfloor \text{ then}$$

$$RIV = N_{SF}(L_{CSFs}-1) + SF_{start}$$

else $$RIV = N_{SF}(N_{SF}-L_{CSFs}+1) + (N_{SF}-1-SF_{start})$$

where $L_{CSFs} \geq 1$ and shall not exceed $N_{SF}-SF_{start}$ [Equation 1]

Herein, $N_{SF}$ represents a number of subframes configuring a basic subframe window, which is designated in advance (or pre-designated) or designated through the SIB, $SF_{start}$ represents a subframe for the PRACH transmission corresponding to the fastest time point within the corresponding subframe window, and $L_{CSFs}$ represents a number of subframes that are to be contiguously allocated from $SF_{start}$ ($SF_{start}$ may be included).

Additionally, as shown in an example of a PRACH resource allocation using the Clustered resource allocation, in case of allocating M number of subframes for the PRACH repetition transmission with respect to the basic subframe window that is configured of $N_{SF}$ number of subframes, which are pre-designated or designed through the SIB, the number of bits in an indicator for indicating this is equal to $$\left\lceil \log_2\left(\binom{N_{SF}}{M}\right) \right\rceil.$$

When it is assumed that subframe indexes that are allocated within a subframe window are given as $s_0, s_1, \ldots, s_{M-1}$, the value of the corresponding indicator may be set to $$r = \sum_{i=0}^{M-1} \binom{N_{SF} - s_i}{M - i}.$$

Configuration Solution 2-3

Configuration Solution 2-3 corresponds to a solution for configuring the corresponding resource by using the PRACH resource configuration.

The PRACH resource configuration may use an existing table or may adopt a new table.

In case of adopting a new table, the following details may be considered.

(1) Configuration may be added so that the PRACH resource can exist only in an Odd SFN.

(2) Resources having short PRACH transmission periods may be excluded. For example, in the case of PRACH configuration index 0 respective to Frame structure type 1, the PRACH resource is configured only for subframe 1 in an even SFN at a period of 20 msec. However, such configuration may be considered to be excluded in the table that is newly adopted.

(3) Additionally, FDM may also be applied with respect to Frame structure type 1. Most particularly, numbers (1), (2), and (3) may be applied in the case when the repetition based PRACH transmission is configured. The corresponding resources may correspond to a format that is related to the PRACH format, and the corresponding resources may be expressed in a format indicating the starting point of each repetition unit (the legacy PRACH format preamble).

In case of the above-described Configuration Solutions 2-1 and 2-2, in accordance with the PRACH format, the allocation respective to some of the resources may not be supported, and, in this case, the corresponding configuration may be designated as a miss configuration of the user device (or user equipment). And, in this case, it is assumed that the user equipment does not transmit the repeated PRACH. Eventually, it may be interpreted that the MTC device is not supported.

Meanwhile, even in case of the Frame structure type 1 (frame structure that is being applied to FDD), FDM may be additionally considered, and the resource for the FDM may be allocated by using the method described below.

Configuration Solution 2-A

Configuration Solution 2-A corresponds to a solution for configuring a resource for FDM in the Frame structure type 1 by signaling a single frequency offset or multiple frequency offsets through the SIB.

Configuration Solution 2-B

Configuration Solution 2-B A corresponds to a solution for allocating multiple frequency domain resources by using the frequency offset allocated for the MTC device as the respective parameter.

At this point, the number of resources in the frequency domain may be configured through the SIB.

More specifically, a method of redefining the table respective to the PRACH resource configuration or a method of adopting a new table may be applied.

At this point, the table respective to the PRACH resource configuration that is redefined or newly adopted may include parameter information, which may be used when selecting a PRB respective to the final PRACH transmission.

Meanwhile, the corresponding frequency domain resource may also be applied when performing FDM, or the corresponding resource may also be used as resource that is to be used when performing frequency hopping with respect to the PRACH that is repeatedly transmitted.

Basically, SFN or a format that is related to the subframe index may be considered for the Hopping pattern, and, the hopping pattern may be cell-specifically decided with respect to all cases. Alternatively, whether or not the hopping is performed and the hopping pattern may be independently configured in accordance with the parameter set.

As a more detailed example, in case of the hopping method, while the hopping pattern (i.e., a position change order in the frequency domain where the PRACH transmission is performed based on the hopping) is pre-defined, the hopping period may be configured in units of multiple subframes (i.e., the PRACH transmission position within the frequency domain may be changed in the corresponding multiple subframe units).

For example, in case the basic unit is configured of 10 subframes, it may be considered that the position of the frequency is equally (or identically) maintained during the 10 subframes, and, then, with respect to the next 10 subframes, it may be considered that the position of the frequency can be changed to another pre-designated position.

Herein, the number of subframes that configure the sub-frame set, which is used as the basic unit, may be configured through the SIB.

The pre-determined subframes (e.g., 10 subframes) may designate contiguous subframes or may designate subframes corresponding to non-contiguous time domain PRACH resources.

III. Third Disclosure of This Specification

The third disclosure of this specification proposes a generation solution for a PRACH preamble sequence according to multiple parameter sets.

Herein, the parameter set may include PRACH differentiation and repetition levels, and so on, with respect to the legacy user equipment (UE) and MTC device, and a set of multiple preamble sequence generation methods may be configured for each parameter set.

For each of the above-described groups or for each repetition level, TDM/FDM may be performed on the PRACH resource so that the resources do not overlap with one another (exclusively), or the PRACH resource may be configured or allocated so that some or all of the resources overlap one another.

In this case, the resources should be differentiated from one another by performing CDM between the PRACHs, and the CDM may be expressed as a set of root index and cyclic shift, which are used when generating a PRACH preamble sequence.

In case of separately designating a preamble set for each repetition level when performing CDM between PRACHs respective to different repetition levels, when the base station (eNodeB) detects the PRACH, the preamble candidates for each of the corresponding repetition levels may be reduced. In this case, the detection performance may be enhanced, and there is also an advantage in that management respective to each repetition level can be carried out easily.

More specifically, a solution for configuring a preamble sequence for each of the multiple parameter sets (including repetition levels) is as described below.

Configuration Solution 3-1

Configuration Solution 3-1 corresponds to a solution for sequentially generating PRACH preamble sequences by using a cyclic shift starting from a pre-determined (initial) root index, which is pre-determined with respect to the MTC device.

The root index may be configured independently from a root index respective to the legacy user equipment (UE).

Thereafter, the preamble sequences, which are generated as described above, may be allocated for each repetition level.

Additionally, it may be considered to designate a preamble set for each PRACH parameter set, and information on the corresponding set or a number of preamble sequences that are allocated for each PRACH parameter set, and so on, may be signaled.

Herein, the PRACH parameter set may correspond to a set having different repetition levels.

Furthermore, it may be considered to include multiple repetition levels with respect to part of the parameter set.

Configuration Solution 3-2

Configuration Solution 3-2 corresponds to a solution for designating starting point when applying root index and cyclic shift with respect to each PRACH parameter set and for generating a PRACH preamble sequence by using the root index and cyclic shift starting points, which are designated for each PRACH parameter set.

The PRACH parameter sets may be differentiated as a PRACH respective to the legacy UE and a PRACH respective to the MTC device, and the configuration of the starting point of the cyclic shift for the PRACH respective to the legacy UE may be omitted.

The advantage of Configuration Solution 3-2 is that, by additionally generating a preamble sequence respective to the MTC device consecutively with respect to the generation of a PRACH preamble sequence respective to the legacy UE, the level of complexity may be decreased when the base station performs PRACH detection, and the detection performance may also be enhanced.

In this case, also, a number of preamble sequences that are allocated for each repetition level within the PRACH parameter set corresponding to the PRACH respective to the MTC device may be signaled.

Configuration Solution 3-3

Configuration Solution 3-3 corresponds to a solution for generating a PRACH preamble sequence from another (initial) root index for each PRACH parameter set.

The PRACH parameter sets may be differentiated from one another for each of the legacy UE and the MTC device, and the PRACH parameter sets may also be differentiated from one another for each repetition level within the MTC device.

In this case, the solution for configuring the (initial) root index for each PRACH parameter set is as described below.

Configuration Solution 3-3-1

Configuration Solution 3-3-1 corresponds to a solution for configuring the (initial) root index by having the root index signaled for each PRACH parameter set.

Configuration Solution 3-3-2

Configuration Solution 3-3-2 corresponds to a solution for generating a preamble sequence by using a method of signaling a (initial) root index with respect to the basic PRACH parameter set and incrementing the (initial) root index by 1 with respect to the remaining parameter sets.

Configuration Solution 3-3-3

Configuration Solution 3-3-3 corresponds to a solution for generating a preamble sequence by using a method of signaling a (initial) root index with respect to the basic PRACH parameter set and incrementing the (initial) root index by a specific value (or delta value) with respect to the remaining parameter sets.

Herein, the specific value may be configured through the SIB.

Herein, the root index respective to the basic PRACH parameter set may correspond to the root index that is configured through the SIB with respect to the MTC device. Additionally, configuration according to the repetition levels respective to other parameter sets may also be considered. In this case also, the number of preamble sequences that are allocated for each PRACH parameter set corresponding to the respective repetition level may be signaled.

<Additional Disclosure of This Specification Configuration of the PRACH Format Respective to Repetition Levels>

Configuration solutions of the PRACH format according to the repetition levels according to additional disclosure of this specification will hereinafter be described in detail.

This may be performed when an adequate PRACH format is configured in accordance with a target cell radius or a channel environment.

In case of part of the PRACH formats, as a purpose of enhancing the link performance, there occurs a case when the sequence portion of the PRACH preamble is repeated twice.

Accordingly, in case of using a format that is already being transmitted in accordance with the repetition level, a solution for increasing the number of repetitions in contrast with the number of subframes that are used may be considered.

More specifically, the PRACH format may be independently configured between the legacy UE and the MTC device, or the PRACH format may be independently configured for each repetition level within the MTC device.

However, in case multiple PRACH formats exist within the same resource, since the detection performance may be degraded, settings may be made so that this solution can only be applied to cases when the PRACH resources between the corresponding parameter sets do not overlap.

The exemplary embodiments of the present invention, which have been described above, may be implemented by using diverse means. For example, the exemplary embodiments of the present invention may be implemented as hardware, firmware, software, or a combination of the above. Description will be made more specifically with reference to the drawings.

Figure 12:
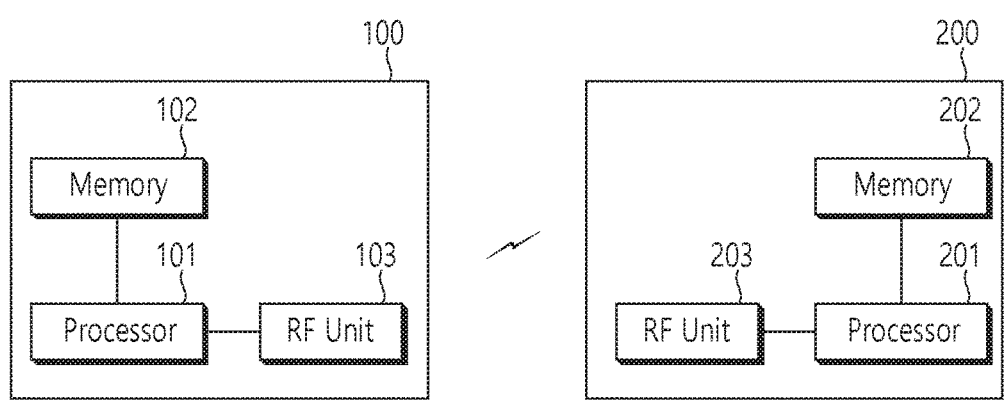
FIG. 12 illustrates a block diagram showing a wireless communication system in which the disclosure of this specification is implemented.

FIG. 12 Illustrates a Block Diagram Showing a Wireless Communication System in Which the Disclosure of This Specification is Implemented.

The base station 200 includes a processor 201, a memory 202, and a RF (radio frequency) unit 203. The memory 202 is connected to the processor 201 and stores diverse information for driving the processor 201. The RF unit 203 is connected to the processor 201, thereby being capable of transmitting and/or receiving radio signals. The processor 201 implements the proposed functions, processes, and/or methods. In the above-described exemplary embodiments, the operations of the base station may be implemented by the processor 201.

The MTC device 100 includes a processor 101, a memory 102, and a RF unit 103. The memory 102 is connected to the processor 101 and stores diverse information for driving the processor 101. The RF unit 103 is connected to the processor 101, thereby being capable of transmitting and/or receiving radio signals. The processor 101 implements the proposed functions, processes, and/or methods. In the above-described exemplary embodiments, the operations of the base station may be implemented by the processor 101.

The processor may include an ASIC (application-specific integrated circuit), another chip set, a logical circuit, and/or a data processing device. The memory include a ROM (read-only memory), a RAM (random access memory), a flash memory, a memory card, a storage medium, and/or another storage device. The RF unit may include one or more antennas transmitting and/or receiving radio signals. When the exemplary embodiment is implemented as software, the above-described method may be implemented as a module (process, function, and so on) performing the above-described functions. The module may be stored in the memory and may be executed by the processor. The memory may be located inside or outside of the processor and may be connected to the processor through a diversity of well-known means.

The MTC device according to a disclosure of this specification corresponds to a MTC (Machine Type Communication) device being located in a coverage enhancement region so as to perform a random access procedure, and the MTC device may include a transceiver transmitting a random access preamble to a specific cell, and a processor deciding a PRACH resource respective to the random access preamble based on a repetition level, and controlling the transceiver so as to repeatedly transmit the random access preamble in accordance with the repetition level within the decided PRACH resource.

Herein, the PRACH resource may be decided by a first period, a second period, and an offset, wherein the first period may correspond to a period between the sections available for transmission corresponding to the random access preamble, the second period may correspond to a period between start timings of the random access preamble within the transmission period, and the offset may correspond to a time difference between a start timing of the transmission period and a start timing of the random access preamble.

The first period, the second period, and the offset may be configured in the MTC device through a higher layer signal sent from a base station.

In the above-described exemplary system, although the methods are described based on a flow chart by using a series of process steps and blocks, the present invention will not be limited only to the order of the given process steps, and some process steps may be carried out in an order that is different from the one that is described above or may be carried out simultaneously. Additionally, it will be apparent to anyone skilled in the art that the process steps shown in the flow chart are not exclusive and that other process steps may be included and that one or more process steps of the flow chart may be deleted without causing any influence on the scope of the present invention.

As described above, according to the disclosure of this specification, the above-described technical problems of the related art are resolved. More specifically, according to the disclosure of this specification, due to the enhancement of the reception performance and decoding performance of the base station with respect to the MTC device, which is located in the coverage enhancement region of the base station, there is an advantage in that an efficient and excellent random access procedure can be performed.

What is claimed is:

1. A method for performing a random access procedure, the method performed by a Machine Type Communication (MTC) device being located in a coverage enhancement region and the method comprising:

determining a Physical Random Access Channel (PRACH) resource for a random access preamble according to a first period, a second period, and an offset, wherein the first period corresponds to a period between transmission periods available for the random access preamble, wherein the second period corresponds to a period between start timings of the random access preamble within the transmission periods, wherein the offset corresponds to an offset dependent on the first period and/or the second period, wherein the first period, the second period, and the offset are independently configured in accordance with a repetition level, and wherein the first period, the second period, and the offset are configured in the MTC device through a higher layer signal sent from a base station;

generating the random access preamble toward a specific cell; and repeatedly transmitting the generated random access preamble in accordance with the repetition level within the determined PRACH resource.

2. The method of claim 1, wherein the first period, the second period, and the offset are configured in the MTC device through a system information block (SIB).

3. The method of claim 1, wherein the PRACH resource is determined through a PRACH configuration index.

4. The method of claim 1, wherein a preamble format corresponding to the random access preamble is determined based on the repetition level.

5. A machine type communication (MTC) device for performing a random access procedure in a coverage enhancement region, the MTC device comprising:

a transceiver configured to transmit a random access preamble toward a specific cell; and a processor configured to determine a Physical Random Access Channel (PRACH) resource for the random access preamble according to a first period, a second period, and an offset, and control the transceiver so as to repeatedly transmit the random access preamble in accordance with a repetition level within the determined PRACH resource, wherein the first period corresponds to a period between transmission periods available for the random access preamble, wherein the second period corresponds to a period between start timings of the random access preamble within the transmission periods, wherein the offset corresponds to an offset dependent on the first period and/or the second period, wherein the first period, the second period, and the offset are independently configured in accordance with the repetition level, and wherein the first period, the second period, and the offset are configured in the MTC device through a higher layer signal sent from a base station.

* * * * *